Patented May 26, 1925.

1,539,342

UNITED STATES PATENT OFFICE.

EVAN C. WILLIAMS, OF HUDDERSFIELD, ENGLAND, ASSIGNOR TO NATIONAL BENZOLE ASSOCIATION, OF LONDON, ENGLAND.

ADSORBENT MATERIAL AND THE MANUFACTURE AND APPLICATION THEREOF.

No Drawing. Application filed December 8, 1923. Serial No. 679,499.

*To all whom it may concern:*

Be it known that I, EVAN CLIFFORD WILLIAMS, a subject of the King of Great Britain, residing at Huddersfield, in the county of York and Kingdom of England, have invented certain new and useful Improvements in Adsorbent Materials and the Manufacture and Application Thereof, of which the following is a specification.

This invention relates to an improvement in adsorbent materials and in the manufacture and application thereof.

It is known that silica can be obtained in the gel form e. g. by treating sodium silicate solutions with acid, washing with water with or without dialysis and drying the washed gel at ordinary temperature in vacuo or at a raised temperature. Such a dried gel is known to possess powerful adsorbent properties and it has been proposed to use it for separating the various constituents of gases or liquids.

When such a gel is prepared according to known methods, even after prolonged washing with water, it is found that on heating to a temperature of say 900° C. the adsorptive properties of the gel are materially reduced. It is one object of my invention to overcome this disadvantage since vigorous heating of the gel is most desirable for purposes of revivification.

I have discovered that a gel which is practically free from alkali metal salts can be so heated to say 900° C. with safety. Apparently the traces of alkali metal salts present in gels hitherto prepared are capable of causing some catalytic acceleration of the crystallization of the silica gel on heating and this effect is enormously reduced in absence of alkali metal salts.

The invention further includes the separation of constituents from fluids e. g. liquids or gases, by the aid of silica gel containing practically no alkali metal salts and the revivification of the gel by heating to a high temperature.

The invention specifically includes one method of obtaining such a gel, namely by the hydrolysis of silicon compounds in absence of soluble and non-volatile bases, but the gel free from alkali metal salts and possessing the desirable property already mentioned, is considered to be a broadly novel product.

*Example.*

Silicon chloride is poured into water with vigorous agitation. A firm gel is formed very rapidly by adding 12% of the chloride by volume. If less chloride is added, the mixture sets to a gel on standing. It is preferred to use 8 to 9% of silicon chloride by volume when the mixture sets to a firm gel in 2 to 6 hours.

The gel is washed and then carefully dried at 100° C. with heat though it may be dried direct (without washing) if desired, thus the drying may last 12-24 hours; the temperature may then be slowly raised to 400° C.

Care is taken not to destroy the microstructure of the gel and thus to affect its adsorptive properties.

The product is practically free from alkali metal salts such as sodium chloride or sulphate. Traces of such salts are undesirable since they tend to accelerate crystallization of the amorphous silica. Hence the gel obtained by my process can be heated to a higher temperature without destroying its adsorptive properties e. g. up to 900° to 1000° C.

Silica gel free from alkali metal salts (whether prepared as above described or in other manner) can be used for adsorbing constituents from a liquid or a gas and I find that in treating coal gas or coke oven gas the silica gel is contaminated by tar, or polymerized products e. g. of diolefinic nature and thus it must be revivified by heating in an oxidizing atmosphere. The gel produced according to my invention is particularly valuable for treating such gases since I can revivify it by heating to a temperature sufficient to burn off such polymerized bodies without seriously affecting the adsorptive properties. Silicon sulphide or various silicon halogen compounds can also be used as raw materials.

I declare that what I claim is:—

1. Adsorptive silica gel free from alkali metal salts.

2. Adsorptive silica gel so free from alkali metal compounds that it can be repeatedly heated to about 900° C. without substantial diminution of its adsorptive powers.

3. The process of producing dry silica gel which comprises mixing silicon chloride with water with such agitation and in such proportions that a gel is obtained on standing and then drying said gel slowly by heating.

In witness whereof, I have hereunto signed my name this 22 day of November 1923, in the presence of two subscribing witnesses.

E. C. WILLIAMS.

Witnesses:
HAROLD E. POTTS,
E. DREW BARTLETT.